United States Patent
De Salis et al.

(10) Patent No.: US 12,040,682 B2
(45) Date of Patent: Jul. 16, 2024

(54) HYBRID POWER TRAIN WITH A LOW-VOLTAGE MOTOR-GENERATOR

(71) Applicants: MAHLE Powertrain, LLC, Plymouth, MI (US); INDYCAR, LLC, Indianapolis, IN (US)

(72) Inventors: Rupert Tull De Salis, Ann Arbor, MI (US); Darren Sansum, Avon, IN (US)

(73) Assignee: INDYCAR, LLC, Indianapolis, IN (US)

( * ) Notice: Subject to any disclaimer, the term of this patent is extended or adjusted under 35 U.S.C. 154(b) by 32 days.

(21) Appl. No.: 17/854,235

(22) Filed: Jun. 30, 2022

(65) Prior Publication Data

US 2023/0006506 A1 Jan. 5, 2023

(30) Foreign Application Priority Data

Jul. 2, 2021 (EP) ..................................... 2183335

(51) Int. Cl.
*H02K 7/00* (2006.01)
*B60K 6/28* (2007.10)
(Continued)

(52) U.S. Cl.
CPC ............. *H02K 7/006* (2013.01); *B60K 6/28* (2013.01); *B60K 6/38* (2013.01); *B60K 6/40* (2013.01);
(Continued)

(58) Field of Classification Search
CPC .......... H02K 7/006; H02K 11/30; H02K 5/24; H02K 7/003; H02K 7/108; H02K 7/116;
(Continued)

(56) References Cited

U.S. PATENT DOCUMENTS 6,481,517 B1 * 11/2002 Kobayashi ............... B60K 6/28 903/952
10,227,860 B1 * 3/2019 McMullen ............ F04D 29/051
(Continued)

FOREIGN PATENT DOCUMENTS

JP 202137941 A 3/2021

OTHER PUBLICATIONS

International Search Report and Written Opinion issued by the U.S. International Searching Authority in PCT/US2022/035891 on Oct. 27, 2022, pp. 1-7.

*Primary Examiner* — Viet P Nguyen
(74) *Attorney, Agent, or Firm* — Ice Miller LLP

(57) ABSTRACT

A hybrid power train with a low-voltage motor-generator. Such a hybrid power train may include a low-voltage motor-generator arranged in a concentric manner around a drive shaft to form a driving connection between a rotor of the low-voltage motor-generator and the drive shaft; and a hollow shaft between the low-voltage motor-generator and the drive shaft, the hollow shaft comprising an outer spline at a first end portion, connected to the rotor of the low-voltage motor-generator, and an inner spline at a second end portion, connected to the drive shaft, wherein both the connection of the outer spline to the rotor of the low-voltage motor-generator and the connection of the inner spline to the drive shaft is faulted as a crowned spline connection to accommodate for horizontal and/or vertical angular misalignment and/or horizontal and/or vertical displacement between the drive shaft and the rotor.

25 Claims, 2 Drawing Sheets

(51) Int. Cl.
  *B60K 6/38*     (2007.10)
  *B60K 6/40*     (2007.10)
  *H02K 5/24*     (2006.01)
  *H02K 7/108*    (2006.01)
  *H02K 7/116*    (2006.01)
  *H02K 11/00*    (2016.01)
  *H02K 11/30*    (2016.01)
  *B60W 20/00*    (2016.01)

(52) U.S. Cl.
  CPC ............... *H02K 5/24* (2013.01); *H02K 7/003* (2013.01); *H02K 7/108* (2013.01); *H02K 7/116* (2013.01); *H02K 11/0094* (2013.01); *H02K 11/30* (2016.01); *B60W 20/00* (2013.01); *B60W 2540/00* (2013.01); *B60W 2555/20* (2020.02); *B60W 2710/081* (2013.01); *B60W 2710/083* (2013.01); *B60Y 2200/92* (2013.01); *B60Y 2400/60* (2013.01)

(58) Field of Classification Search
  CPC ........ H02K 11/0094; B60K 6/28; B60K 6/38; B60K 6/40
  See application file for complete search history.

(56) References Cited

U.S. PATENT DOCUMENTS

| | | |
|---|---|---|
| 2010/0248561 A1 | 9/2010 | Daikoku |
| 2015/0204393 A1 | 7/2015 | Holmes |
| 2018/0093656 A1* | 4/2018 | Yamazaki ............. B60K 6/387 |
| 2019/0031180 A1 | 1/2019 | Lee et al. |
| 2021/0107348 A1 | 4/2021 | Shidore et al. |

* cited by examiner

HYBRID POWER TRAIN WITH A LOW-VOLTAGE MOTOR-GENERATOR

CROSS-REFERENCE TO RELATED APPLICATIONS

This application claims priority under 35 U.S.C. § 119(b) to European Application No. 2183335.5, filed Jul. 2, 2021, the disclosure of which is incorporated herein by reference in its entirety.

The present invention relates to a hybrid power train with a low-voltage motor-generator, in particular with a 48V motor-generator, according to the independent claim.

Hybrid power trains in prior art consist of an internal combustion engine, a high voltage motor-generator with an inverter, an electrical power source, a drive shaft that transmits mechanical force of the internal combustion engine and the high voltage motor-generator, and an electronic control unit that controls the high voltage motor-generator and the inverter.

Such a hybrid power train is used for example to harvest mechanical kinetic energy from the vehicle during deceleration, part-throttle and braking events, and converting it to electrical energy by using the high voltage motor-generator and the inverter. The electrical energy is stored in the electrical power source and is released to drive high voltage motor-generator at a time when additional power is required, e.g., at acceleration events.

As hybrid power trains in the prior art operate using high voltage for driving the motor-generator these systems present a safety risk in the event of human contact with electrical conductors in the system. Electrical conductors are found in the high voltage motor-generator, the inverter, the electrical power source, and the electronic control unit. Such electrical conductors are often located in locations of the vehicle that are vulnerable to damage. Therefore, a damage can expose high voltage conductors to human contact in the event of collision or other forms of unintended damage.

Prior art hybrid power trains try to overcome this safety hazard measures such as the provision of additional insulation. Such measures are expensive, however, and can be obviated in the event of servicing operations, when parts are disassembled, or vehicle collisions, which are particularly frequent in motorsport.

It is an object of the present invention to provide a hybrid power train for vehicles with a low-voltage motor-generator configured to overcome or at least reduce the disadvantages known from the prior art and in particular hazards to a driver, maintenance personnel, safety crews, and others during collisions.

This object is solved by the present invention according to the subject-matter of the independent claim. Advantageous aspects of the invention are the subject of the dependent claims.

The invention comprises a hybrid power train for vehicles or other equipment with a low-voltage motor-generator, in particular with a 48V motor-generator, comprising:
an internal combustion engine;
a clutch operatively connected to the internal combustion engine;
a drive shaft which at a first end portion is operatively connected to the clutch, and which at a second end portion is operatively connected to a gearbox;
a low-voltage motor-generator operatively connected to the drive shaft;
an inverter unit operatively connected to the low-voltage motor-generator;
an electronic control unit;
an electric power source operatively connected to the inverter unit;
wherein the low-voltage motor-generator is arranged in a concentric manner around the drive shaft in such a way as to form a driving connection between a rotor of the low-voltage motor-generator and the drive shaft;
wherein the low-voltage motor-generator, the inverter unit, the electric power source, and the gearbox are arranged entirely inside a bell housing of the gearbox. A low-voltage motor-generator works with power supplied at or below 60 V, in particular with the commonly used designation 48V. The electronic control unit comprises a) at least one controller arranged in the bellhousing and no controller arranged out of the bellhousing; b) two or more controllers, wherein at least one controller is arranged in the bellhousing and at least one controller is arranged out of the bellhousing; or c) at least one controller arranged out of the bellhousing and no controller arranged in the bellhousing.

In that the low-voltage motor-generator, the inverter unit, the electric power source, the gearbox, and, in an advantageous aspect, the electronic control unit are arranged entirely inside a bell housing of the gearbox, the current-carrying components, i.e., the low-voltage motor-generator, the inverter unit, the electric power source, and, in such an advantageous aspect, the electronic control unit, are not directly exposed to access from outside the bell housing of the gearbox. Thus it is much safer for a human user, which can not get in direct contact with these high amperage current-carrying components. In case of b) two or more controllers, wherein at least one controller is arranged in the bellhousing and at least one controller is arranged out of the bellhousing advantageously, the high current-carrying controller can be arranged in the bellhousing and the low current-carrying controller can be arranged out of the bellhousing. In case of c) at least one controller arranged out of the bellhousing and no controller arranged in the bellhousing, advantageously any high current-carrying controller can be covered from human contact either by separate means or by an covered arrangement.

Preferably, the at least one controller arranged out of the bellhousing is arranged at an outer sidewall of the bellhousing. That allows for a close arrangement.

Further preferred, the electronic control unit comprises one controller capable of controlling the high power switching between phases of the motor to allow the basic control of speed and torque.

Also preferred, the electronic control unit comprises one controller capable of operating torque and speed based on a variety of inputs such as driver demand, engine operation, temperature, environmental and/or application inputs.

The low-voltage motor-generator, the inverter unit, the electric power source, and the gearbox have a size and shape as to fit entirely inside a bell housing of the gearbox. In an advantageous aspect, the electronic control unit also has a size and shape to fit with the other components entirely inside the bell housing of the gearbox.

Moreover, the bellhousing of the gearbox has a size and shape to house the low-voltage motor-generator, the inverter unit, the electric power source, the gearbox, and, in an advantageous aspect, the electronic control unit, entirely.

The low-voltage motor-generator is configured such as to be operated at an operating voltage that is low enough to be safe for human contact. In a preferred embodiment the low-voltage motor-generator is configured such as to be operated at an operating voltage below 60 Volt.

The inverter unit can comprise solid state switches such as MOSFETs.

According to a preferred aspect, the electrical power source is positioned no farther than 1000 mm, in particular no farther than 500 mm, distant from the inverter unit. This allows to position the electrical power source close to the inverter unit and both the electrical power source and the inverter unit inside the bell housing of the gearbox.

According to another preferred aspect, the inverter unit is positioned no farther than 1000 mm, in particular no farther than 100 mm, distant from the low-voltage motor-generator. This allows to position the inverter unit close to the low-voltage motor-generator and both the inverter unit and the low-voltage motor-generator inside the bell housing of the gearbox.

According to a particularly preferred aspect, the low-voltage motor-generator comprises axial single-pole conductors, which are configured being able to conduct at least 300 Ampere each. The inverter unit is configured such that it provides at least two solid state switches for each axial single-pole conductor of the low-voltage motor-generator. The solid state switches are directly arranged at the respective single-pole conductor. The low-voltage motor-generator comprising axial single-pole conductors, which are configured being able to conduct at least 300 Ampere each allows for operating the low-voltage motor-generator with more than 30 kW operating power at operating voltages that are safe for human contact, and in particular at operating voltages below 60V.

According to an advantageous aspect, the low-voltage motor-generator is configured in such a way as to provide an operating power of at least 30 kW, and preferably of at least 45 kW. According to other advantageous aspects, the low-voltage motor-generator is configured in such a way as to provide an operating power of at least 75 kW, and preferably of at least 105 kW. This operating power renders the low-voltage motor-generator suitable for use as an electric driving motor in, for example and without limitation, motorcycles and cars, especially for motor sports.

According to another advantageous aspect, the low-voltage motor-generator operates with an operating voltage below a threshold voltage that is safe for human contact, and preferably with an operating voltage below 60 Volt. This renders the hybrid power train more safe against hazard caused to human users by the electrical drive compared to hybrid power trains designed for high-voltage operation, e.g., which use a motor-generator operating at 800V operating voltage.

According to a particularly advantageous aspect, the electric power source comprises capacitors. Such capacitors can be designed as ultracapacitors. Since the electric power source comprises capacitors, a higher electrical power can be provided within a shorter period of time, for example, compared to batteries. This allows for a higher acceleration of the vehicle, due at least in part to reduced weight through the use of capacitors versus batteries.

According to a particularly advantageous aspect, the electric power source comprises capacitors only.

According to a beneficial aspect, a hollow shaft is arranged between the low-voltage motor-generator and the drive shaft. The hollow shaft comprises an outer spline at a first end portion, connected to the rotor of the low-voltage motor-generator and an inner spline at a second end portion, connected to the drive shaft.

Both the connection of the outer spline to the rotor of the low-voltage motor-generator and the connection of the inner spline to the drive shaft is formed as a crowned spline connection in such a way as to being able to accommodate for a horizontal and/or vertical angular misalignment; and/or a horizontal and/or vertical displacement between the drive shaft and the rotor of the low-voltage motor-generator.

In this way, the transmission of vibrations from the drive shaft, which are generated by the combustion engine, to the low-voltage motor-generator and in particular to the inverter unit, which is operatively connected to the low-voltage motor-generator, can be reduced by the use of the hollow shaft. In this way, the low-voltage motor-generator and the inverter unit are protected from harmful mechanical impact that would be caused by the vibrations.

According to another beneficial aspect, the hybrid power train comprises at least: a first damping element arranged in between the drive shaft and the hollow shaft at the first end portion of the hollow shaft; and a second damping element arranged in between the drive shaft and the hollow shaft at the second end portion of the hollow shaft;

wherein the at least first damping element and second damping element are configured in such a way as to dampen the transmission of horizontal and/or vertical angular movements of the drive shaft via the hollow shaft to the rotor of the low-voltage motor-generator.

In this way, the transmission of vibrations from the drive shaft, which are generated by the combustion engine, to the low-voltage motor-generator and in particular to the inverter unit, which is operatively connected to the low-voltage motor-generator, can be reduced by the use of the damping elements. In this way, the low-voltage motor-generator and the inverter unit are protected from harmful mechanical impact that would be caused by the vibrations.

The damping elements can be designed as ring elements positioned around the driving shaft and/or the hollow shaft, preferably as ring elements comprising rubber material. According to a particularly beneficial aspect, the length of the hollow shaft in between the outer spline at the first end portion of the hollow shaft and the inner spline at the second end portion of the hollow shaft is in a range between 20% and 200% of the length of the low-voltage motor-generator, and preferably in a range between 50% and 100% of the length of the low-voltage motor-generator.

In this way, the hollow shaft is configured such as to being able to accommodate for
  a horizontal and/or vertical angular misalignment; and/or
  a horizontal and/or vertical displacement between the drive shaft and the rotor of the low-voltage motor-generator.

The advantages of the invention are described in the following in connection to the drawings. In the following:

Figure 1:
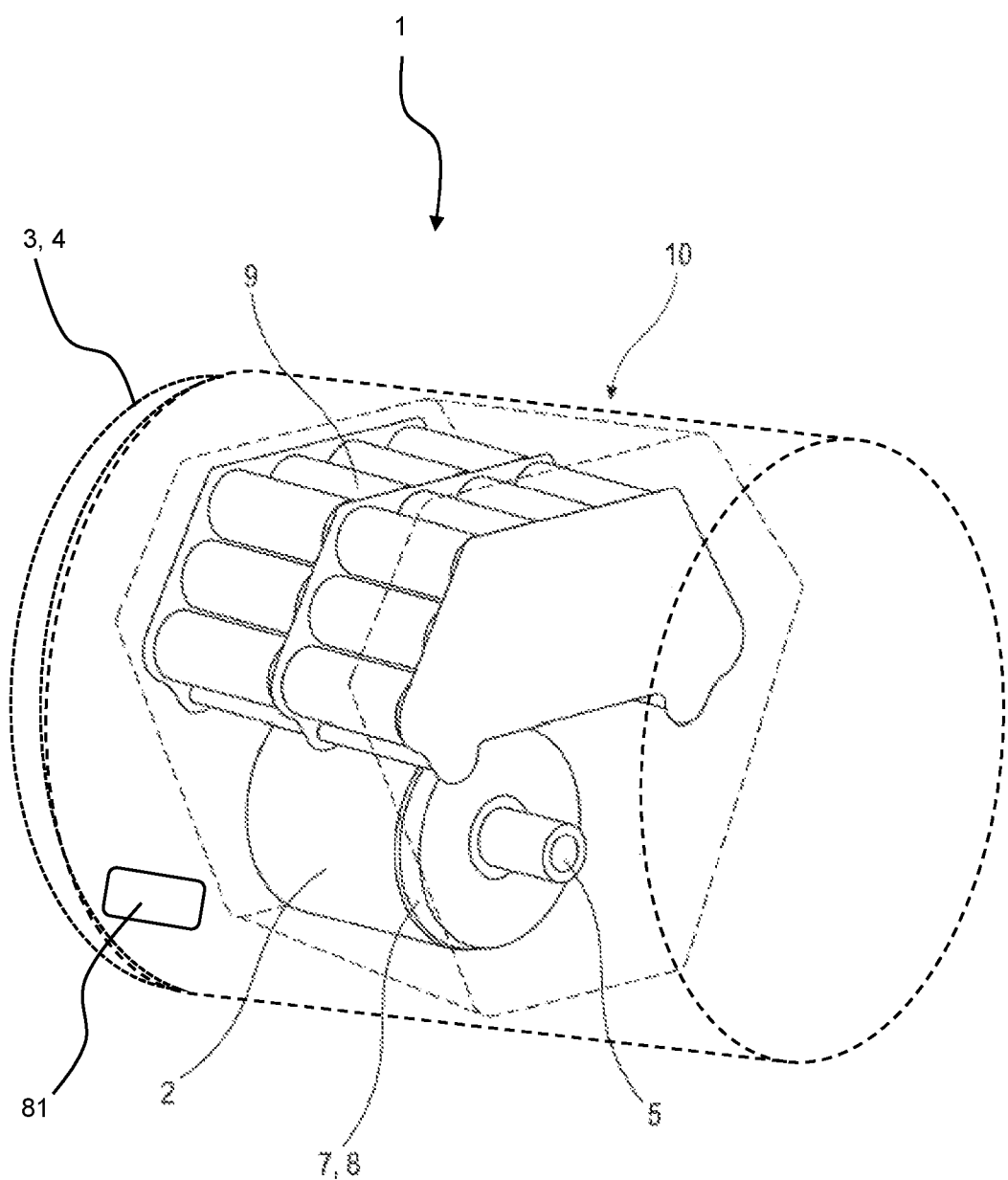
FIG. 1 shows the low-voltage motor-generator, the inverter unit, the electronic control unit, the electric power source, and the gearbox arranged entirely inside a bell housing of the gearbox.

FIG. 1 shows the low-voltage motor-generator 2 for a hybrid powertrain 1 having an internal combustion engine 3 and a clutch 4 operatively connected thereto. The inverter unit 7, the electronic control unit 8 and the electric power source 9 are arranged entirely inside a bell housing 10 of the gearbox (dotted lines). This is enabled partly be the low-voltage motor-generator 2 being arranged in a concentric manner around the drive shaft 5 in such a way as to form a driving connection between a rotor (not shown) of the low-voltage motor-generator 2 and the drive shaft 5.

In that the low-voltage motor-generator 2, the inverter unit 7, the electronic control unit 8, the electric power source 9 are arranged entirely inside a bell housing 10 of the gearbox, the current-carrying components, i.e., the low-voltage motor-generator 2, the inverter unit 7, the electronic control unit 8 and the electric power source 9, are not directly exposed to access from outside the bell housing 10 of the gearbox.

In FIG. 1 also depicts the aspect of an additional controller 81 of the electronic control unit 8 arranged out of the bellhousing and in this example on the outer side wall of the bell housing. Preferably, the additional controller is a low current-carrying controller capable of operating torque and speed based on a variety of inputs such as driver demand, engine operation, temperature, environmental and/or application inputs.

The electronic control unit 8 comprises one controller in the bell housing capable of controlling the high power switching between phases of the motor to allow the basic control of speed and torque.

The third case of (c) at least one controller arranged out of the bellhousing and no controller arranged in the bellhousing can be derived from the illustration in FIG. 1 as well, wherein advantageously any high current-carrying controller can be covered from human contact either by separate means (not shown) or by an covered arrangement (not shown).

The low-voltage motor-generator 2, the inverter unit 7, the electronic control unit 8, the electric power source 9, and the gearbox have a size and shape as to fit entirely inside a bell housing 10 of the gearbox.

The low-voltage motor-generator 2 comprises axial single-pole conductors, which are configured being able to conduct at least 300 Ampere each. This allows for operating the low-voltage motor-generator 2 with more than 30 kW operating power and/or more than 45 kW operating power and/or more than 75 kW operating power and/or more than 105 kW operating power, in each case at operating voltages that are safe for human contact, and in particular at operating voltages below 60V.

The inverter unit 7 is configured such that it provides at least two solid state switches for each axial single-pole conductor of the low-voltage motor-generator 2. The solid state switches are directly arranged at the respective single-pole conductor.

The electric power source 9 comprises capacitors only. Such capacitors can be designed as ultracapacitors. In that the electric power source 9 comprises capacitors only is beneficial for providing higher electrical power within a shorter period of time compared to batteries. This allows for a higher acceleration of the vehicle or other equipment.

Figure 2:
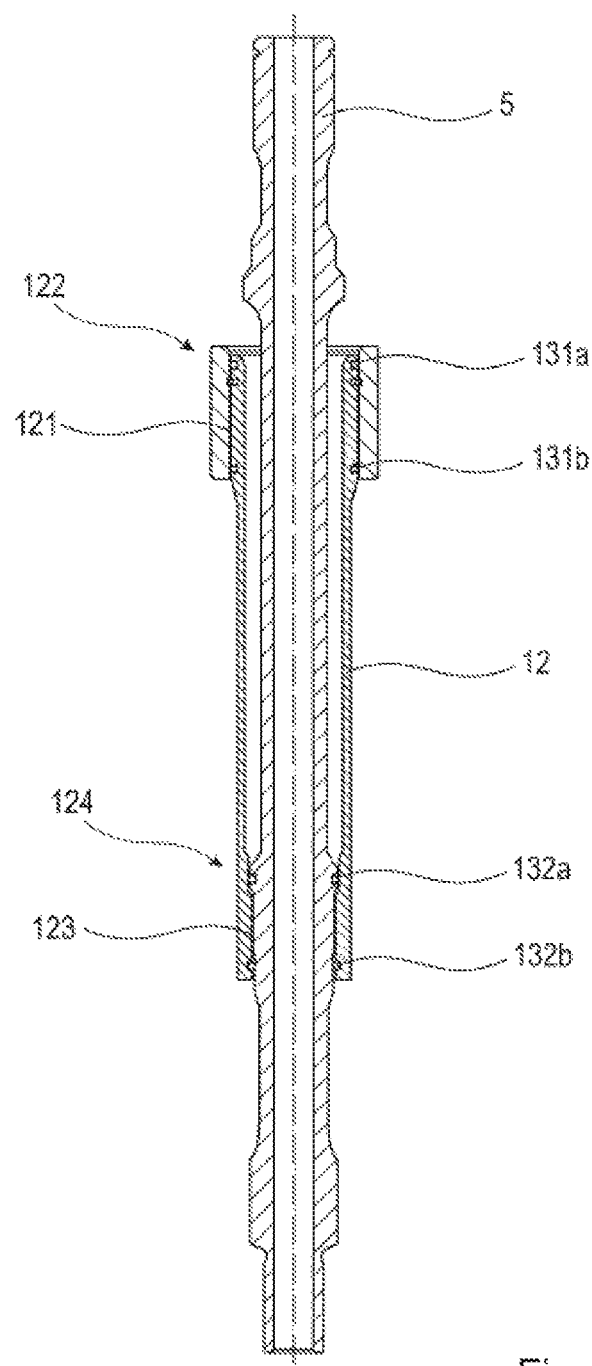
FIG. 2 shows the hollow shaft arranged at the drive shaft.

FIG. 2 shows the hollow shaft 12 arranged at the drive shaft 5. The hollow shaft 12 comprises an outer spline 121 at a first end portion 122, connected to the rotor 21 of the low-voltage motor-generator 2 and an inner spline 123 at a second end portion 124, connected to the drive shaft 5.

Both the connection of the outer spline 121 to the rotor (not shown) of the low-voltage motor-generator (not shown) and the connection of the inner spline 123 to the drive shaft 5 is formed as a crowned spline connection in such a way as to being able to accommodate for a horizontal and/or vertical angular misalignment; and/or a horizontal and/or vertical displacement between the drive shaft 5 and the rotor (not shown) of the low-voltage motor-generator (not shown).

To being able to accommodate for a horizontal and/or vertical angular misalignment; and/or a horizontal and/or vertical displacement between the drive shaft 5 and the rotor (not shown) of the low-voltage motor-generator (not shown) the length of the hollow shaft 12 in between the outer spline 121 at the first end portion 122 of the hollow shaft 12 and the inner spline 123 at the second end portion 124 of the hollow shaft 12 is 100% the length of the low-voltage motor-generator (not shown).

Moreover first damping elements 131a, 131b are arranged in between the drive shaft 5 and the hollow shaft 12 at the first end portion 122 of the hollow shaft 12; and second damping elements 132a, 132b are arranged in between the drive shaft 5 and the hollow shaft 12 at the second end portion 124 of the hollow shaft 12.

The damping elements 131a, 131b, 132a, 132b are configured in such a way as to dampen the transmission of horizontal and/or vertical angular movements of the drive shaft 5 via the hollow shaft 12 to the rotor (not shown) of the low-voltage motor-generator (not shown). The damping elements 131a, 131b, 132a, 132b in FIG. 2 are designed as ring elements positioned around the driving shaft 5 or the hollow shaft 12 and are made of a rubber material.

In this way, the transmission of vibrations from the drive shaft 5, which are generated by the combustion engine (not shown), to the low-voltage motor-generator (not shown) and in particular to the inverter unit (not shown), which is operatively connected to the low-voltage motor-generator (not shown), can be reduced by the use of the hollow shaft 12. In this way, the low-voltage motor-generator (not shown) and the inverter unit (not shown) are protected from harmful mechanical impact that would be caused by the vibrations.

According to at least one advantageous aspect, damping elements 131a, 131b, 132a, 132b in FIG. 2 are designed as ring elements and may serve as lubricant retention elements such that a lubricant (not shown) may be retained between damping elements 131a, 131b and/or between damping elements 132a, 132b.

The invention claimed is:

1. A hybrid power train comprising:
an internal combustion engine;
a clutch operatively connected to the internal combustion engine;
a drive shaft which at a first end portion is operatively connected to the clutch, and which at a second end portion is operatively connected to a gearbox;
a low-voltage motor-generator operatively connected to the drive shaft, the low-voltage motor-generator arranged in a concentric manner around the drive shaft in such a way as to form a driving connection between a rotor of the low-voltage motor-generator and the drive shaft;
an inverter unit operatively connected to the low-voltage motor-generator;
an electronic control unit;
an electric power source operatively connected to the inverter unit; and
a hollow shaft arranged between the low-voltage motor-generator and the drive shaft, the hollow shaft comprising:
an outer spline at a first end portion connected to the rotor of the low-voltage motor-generator, and
an inner spline at a second end portion connected to the drive shaft,
wherein both the connection of the outer spline to the rotor of the low-voltage motor-generator and the connection of the inner spline to the drive shaft is formed as a crowned spline connection in such a way as to being able to accommodate for a horizontal and/or vertical angular misalignment and/or a horizontal and/or vertical displacement between the drive shaft and the rotor of the low-voltage motor-generator; and wherein the low-voltage motor-generator, the inverter unit, the electric power source, and the gearbox are arranged entirely inside a bell housing of the gearbox.

2. The hybrid power train according to claim 1, wherein the electronic control unit comprises at least one controller arranged in the bellhousing and no controller arranged out of the bellhousing.

3. The hybrid power train according to claim 1, wherein the electronic control unit comprises two or more controllers, wherein at least one controller is arranged in the bellhousing and at least one controller is arranged out of the bellhousing.

4. The hybrid power train according to claim 3, wherein the at least one controller arranged out of the bellhousing is arranged at an outer sidewall of the bellhousing.

5. The hybrid power train according to claim 1, wherein the electronic control unit comprises at least one controller arranged out of the bellhousing and no controller arranged in the bellhousing.

6. The hybrid power train according to claim 5, wherein the at least one controller arranged out of the bellhousing is arranged at an outer sidewall of the bellhousing.

7. The hybrid power train according to claim 1, wherein the electronic control unit comprises at least one controller capable of controlling the high power switching between phases of the motor to allow the basic control of speed and torque.

8. The hybrid power train according to claim 1, wherein the electronic control unit comprises at least one controller capable of operating torque and speed based on a variety of inputs such as driver demand, engine operation, temperature, environmental and/or application inputs.

9. The hybrid power train according to claim 1, wherein the electrical power source is positioned no farther than 1000 mm distant from the inverter unit.

10. The hybrid power train according to claim 9, wherein the electrical power source is positioned no farther than 500 mm distant from the inverter unit.

11. The hybrid power train according to claim 1, wherein the inverter unit is positioned no farther than 1000 mm distant from the low-voltage motor-generator.

12. The hybrid power train according to claim 11, wherein the inverter unit is positioned no farther than 100 mm distant from the low-voltage motor-generator.

13. The hybrid power train according to claim 1, wherein the low-voltage motor-generator comprises axial single-pole conductors, which are configured being able to conduct at least 300 Ampere each, and wherein the inverter unit is configured such that it provides at least two solid state switches for each axial single-pole conductor of the low-voltage motor-generator, and wherein the solid state switches are directly arranged at the respective single-pole conductor.

14. The hybrid power train according to claim 1, wherein the low-voltage motor-generator is configured in such a way as to provide an operating power of at least 30 kW.

15. The hybrid power train according to claim 14, wherein the low-voltage motor-generator is configured in such a way as to provide an operating power of at least 45 kW.

16. The hybrid power train according to claim 14, wherein the low-voltage motor-generator is configured in such a way as to provide an operating power of at least 75 kW.

17. The hybrid power train according to claim 14, wherein the low-voltage motor-generator is configured in such a way as to provide an operating power of at least 105 kW.

18. The hybrid power train according to claim 1, wherein the low-voltage motor-generator operates with an operating voltage below a threshold voltage that is safe for human contact.

19. The hybrid power train according to claim 1, wherein the low-voltage motor-generator operates with an operating voltage that is less than or equal to 60 Volts.

20. The hybrid power train according to claim 19, wherein the low-voltage motor-generator operates with an operating voltage that is less than or equal to 48 Volts.

21. The hybrid power train according to claim 1, wherein the electric power source comprises capacitors.

22. The hybrid power train according to claim 1, wherein the electric power source consists only of capacitors.

23. The hybrid power train according to claim 1, further comprising:
a first damping element arranged in between the drive shaft and the hollow shaft at the first end portion of the hollow shaft; and
a second damping element arranged in between the drive shaft and the hollow shaft at the second end portion of the hollow shaft;
wherein the at least first damping element and second damping element are configured in such a way as to dampen the transmission of horizontal and/or vertical angular movements of the drive shaft via the hollow shaft to the rotor of the low-voltage motor-generator.

24. The hybrid power train according to claim 1, wherein the length of the hollow shaft in between the outer spline at the first end portion of the hollow shaft and the inner spline at the second end portion of the hollow shaft is in a range between 20% and 200% of the length of the low-voltage motor-generator, and preferably in a range between 50% and 100% of the length of the low-voltage motor-generator.

25. The hybrid power train according to claim 1, further comprising:
a first pair of ring elements arranged in between the drive shaft and the hollow shaft at the first end portion of the hollow shaft, wherein the first pair of ring elements is capable of lubricant retention to retain a lubricant between the first pair of ring elements; and
a second pair of ring elements arranged in between the drive shaft and the hollow shaft at the second end portion of the hollow shaft, wherein the second pair of ring elements is capable of lubricant retention to retain a lubricant between the second pair of ring elements.

* * * * *